United States Patent
Sano et al.

(10) Patent No.: US 7,172,174 B2
(45) Date of Patent: Feb. 6, 2007

(54) LASER WELDING METHOD, LASER WELDING STRUCTURE, AND THROTTLE VALVE DEVICE

(75) Inventors: Ryo Sano, Kariya (JP); Mitsutaka Hirata, Okazaki (JP); Yasunori Kawamoto, Toyota (JP); Hiroyuki Nishina, Okazaki (JP); Youichi Matsui, Nishio (JP)

(73) Assignee: Denso Corporation, Kariya (JP)

( * ) Notice: Subject to any disclaimer, the term of this patent is extended or adjusted under 35 U.S.C. 154(b) by 237 days.

(21) Appl. No.: 10/989,469

(22) Filed: Nov. 17, 2004

(65) Prior Publication Data

US 2005/0109971 A1 May 26, 2005

(30) Foreign Application Priority Data

Nov. 20, 2003 (JP) ............................. 2003-390955

(51) Int. Cl.
 *F16K 1/22* (2006.01)
(52) U.S. Cl. .................................. 251/305; 219/121.64
(58) Field of Classification Search ........ 251/305–308; 29/890.12; 219/121.6, 121.63, 121.64
 See application file for complete search history.

(56) References Cited

U.S. PATENT DOCUMENTS

| | | | | |
|---|---|---|---|---|
| 4,253,641 A | * | 3/1981 | VanRyck | 251/306 |
| 4,335,738 A | * | 6/1982 | Nassir | 251/305 |
| 4,674,528 A | * | 6/1987 | Nishio et al. | 251/308 |
| 5,275,375 A | * | 1/1994 | Semence | 251/308 |
| 5,374,032 A | * | 12/1994 | Pearson et al. | 251/308 |
| 6,354,267 B1 | * | 3/2002 | Kotchi et al. | 251/305 |
| 6,589,380 B2 | * | 7/2003 | Gnage et al. | 29/890.12 |
| 6,612,325 B2 | * | 9/2003 | Rentschler et al. | 29/890.132 |

FOREIGN PATENT DOCUMENTS

| | | |
|---|---|---|
| JP | 61-21757 | 5/1986 |
| JP | 8-86945 | 4/1996 |
| JP | 2001-105500 | 4/2001 |
| JP | 2001-152985 | 6/2001 |
| JP | 2002-331588 | 11/2002 |
| JP | 2003-13751 | 1/2003 |

OTHER PUBLICATIONS

Chinese Examination Report dated Jul. 2006.
JPO Examination Report dated Sep. 12, 2006.

* cited by examiner

*Primary Examiner*—John Bastianelli
(74) *Attorney, Agent, or Firm*—Nixon & Vanderhye P.C.

(57) ABSTRACT

A throttle valve and a throttle shaft are welded to each other. Here, the throttle valve is made of resin material having a transmission property for a laser beam and includes a convex portion on a surface thereof irradiated by the laser beam. By contrast, the throttle shaft is made of resin material having a absorption property for a laser beam. The throttle valve and the throttle shaft are disposed so that their mutual portions to be welded face each other. Laser beams are radiated from the surface of the throttle valve to the mutual portions to be welded so that the convex portion is included in a part of an irradiated region.

12 Claims, 8 Drawing Sheets

LASER WELDING METHOD, LASER WELDING STRUCTURE, AND THROTTLE VALVE DEVICE

CROSS REFERENCE TO RELATED APPLICATIONS

This application is based on and incorporates herein by reference Japanese Patent Application No. 2003-390955 filed on Nov. 20, 2003.

FIELD OF THE INVENTION

The present invention relates to a laser welding method where resin materials are welded to each other by laser irradiation, further relating to a laser welding structure using the method, and a throttle valve device using the method.

BACKGROUND OF THE INVENTION

It is known that a mechanical connection between two components made of resin material is performed by welding using laser irradiation. For instance, a resin-made throttle valve and a resin-made throttle shaft included in a throttle valve device of an internal combustion engine are connected with each other by using a laser welding device (refer to Patent Document 1). In this throttle valve device, the throttle valve being a first component as a welded object is formed of resin material that has a tendency to transmit a laser beam. By contrast, the throttle shaft being a second component is formed of resin material that has a tendency to absorb a laser beam. Thus, when the laser beam is radiated through the throttle valve to the throttle shaft, the surface of the throttle shaft contacting with the throttle valve is heated up. Their boundary areas are thereby melted, so that these components are welded to each other.

Here, the welded portion does not appear as the surface of the final product, so that, for instance, presence or absence of the welded portion cannot be visually observed from an outside of the final product. This poses inexpediency. To solve this inexpediency, a component that transmits the laser beam is provided with an opening, through which the presence and absence of the welded portion can be directly visually observed (refer to Patent Document 2).

Patent Document 1: JP-2003-13751 A (Pages 2, 3; FIGS. 1 to 9)

Patent Document 2: JP-H8-86945 A (Pages 2, 3; FIGS. 1 to 3)

In the above method disclosed in Patent Document 2, necessity of having an opening in the welded portion within the component that is disposed at a position from which the laser beam is radiated, eventually poses a problem that decreases a mechanical strength of the final product. In particular, decreasing the mechanical strength is not accepted by a throttle valve device of an internal combustion engine that undergoes thermal stresses derived from significant mechanical vibrations or rapid thermal fluctuations.

Further, since the welded portion is observed through the opening, observing the welded portion is sometimes difficult depending on lighting conditions. This involves difficulty in confirming, thereby possibly resulting in missing confirming.

SUMMARY OF THE INVENTION

This is an object to provide a laser welding method, a structure, and a throttle valve device that enable an easy visual inspection for a welded portion and restrict decrease in a mechanical strength of the welded portion.

To achieve the above object, a laser welding method of the present invention is for welding with each other a first component that is made of resin material having a transmission property for a laser beam and includes a stepping portion on a surface thereof irradiated by the laser beam and a second component made of resin material having an absorption property for a laser beam. Here, the first component and the second component are disposed so that a portion of the first component to be welded and a portion of the second component to be welded face each other, and the laser beam is radiated from the surface of the first component to the portions to be welded so that the stepping portion is included in a part of an irradiated region.

Further, a laser welding structure of the present invention includes a first component that is made of resin material having a transmission property for a laser beam and includes a stepping portion on a surface thereof irradiated by the laser beam, and a second component that is made of resin material having a absorption property for a laser beam and includes a second surface facing a first surface of the first component. The laser welding structure further includes a welded portion where the first component and the second component are welded because of concurrently melting of at least a part of the first surface and at least a part of the second surface, and a trace of one of melting and burning that is formed at the stepping portion.

On the surface of a first component disposed at a position irradiated by a laser beam, a stepping portion is formed. The laser beam is diffused in the stepping portion to generate melting or burning, so that the visual confirmation of the welding state can be easily and securely performed by checking the trace of the melting or burning generated in the stepping portion of the surface even after the laser welding process is finished.

Further, the above-described laser irradiation is preferably performed by a successive irradiation that is successively executed while an irradiated position is moved. In the successive irradiation, the whole of the welded portions and the stepping portion are thereby irradiated with the laser beams by slightly broadening an irradiated region to thereby include the stepping portion. This eliminates necessity of changing the structure of the laser welding device radiating the laser beams, so that the cost necessary for the laser welding can be prevented from increasing.

Further, the above-described laser irradiation is preferably performed by a bulk irradiation that is executed so that the portions to be welded and the stepping portion are at once irradiated using a light source that is aligned in a row. In the bulk irradiation, the whole of the welded portions and the stepping portion are thereby irradiated with the laser beams by slightly broadening an irradiation region to thereby include the stepping portion. This eliminates necessity of changing the period and the procedure for the laser irradiation, so that the process of the laser welding can be prevented from becoming complex.

Further, the above-described stepping portion is preferably a convex portion. In the convex portion, the laser beams are diffused so that the temperature of the convex portion is increased. Further, the convex portion has a heat capacity lower than the surrounding portions to thereby not easily conduct the heat to the surrounding portions. The melting or burning of the convex portion by the laser irradiation can be securely generated.

Further, the above-described stepping portion is preferably a concave portion. In the concave portion, the laser beams are diffused so that the temperature of the concave portion is increased. The melting or burning of the concave portion by the laser irradiation can be thereby securely generated.

Further, the above-described stepping portion is preferably a penetrating portion formed in a spacing from the surface irradiated by the laser beam to a surface where the welded portion is formed. Here, the trace is at least formed in proximity of the irradiated surface of the penetrating portion. The laser beams are diffused in the proximity of the irradiated surface of the penetrating portion, increasing the temperature in the proximity of the irradiated surface of the penetrating portion. The melting or burning in the proximity of the irradiated surface by the laser irradiation can be thereby securely generated.

Further, the above-described first component is preferably formed by resin molding using a plurality of molding shapes, wherein the stepping portion is a convex portion formed at the resin molding in accordance with fitting surfaces of the plurality of molding shapes. Otherwise, the above-described first component is preferably formed by resin molding using a molding shape, wherein the stepping portion is a convex and concave portion formed in accordance with a pushing pin provided in the molding shape for extracting the first component from the molding shape at the resin molding. This enables visual confirmation of the welding state without adding a process of forming the stepping portion.

Further, in the above-described throttle valve device of the present invention, the first component constituting the laser welding structure is a throttle valve provided within a throttle body becoming a passage of a fuel for feeding an internal combustion engine. By contrast, the second component is a throttle shaft supporting the throttle valve so that an inclination angle to the passage is able to be changed. This enables visual confirmation of the welding state after the welding operation is finished, even when the welding of the throttle valve and the throttle shaft is executed by the laser irradiation.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Hereinbelow, a throttle valve device of an embodiment according to the present invention will be explained in detail with reference to drawings.

Figure 1:
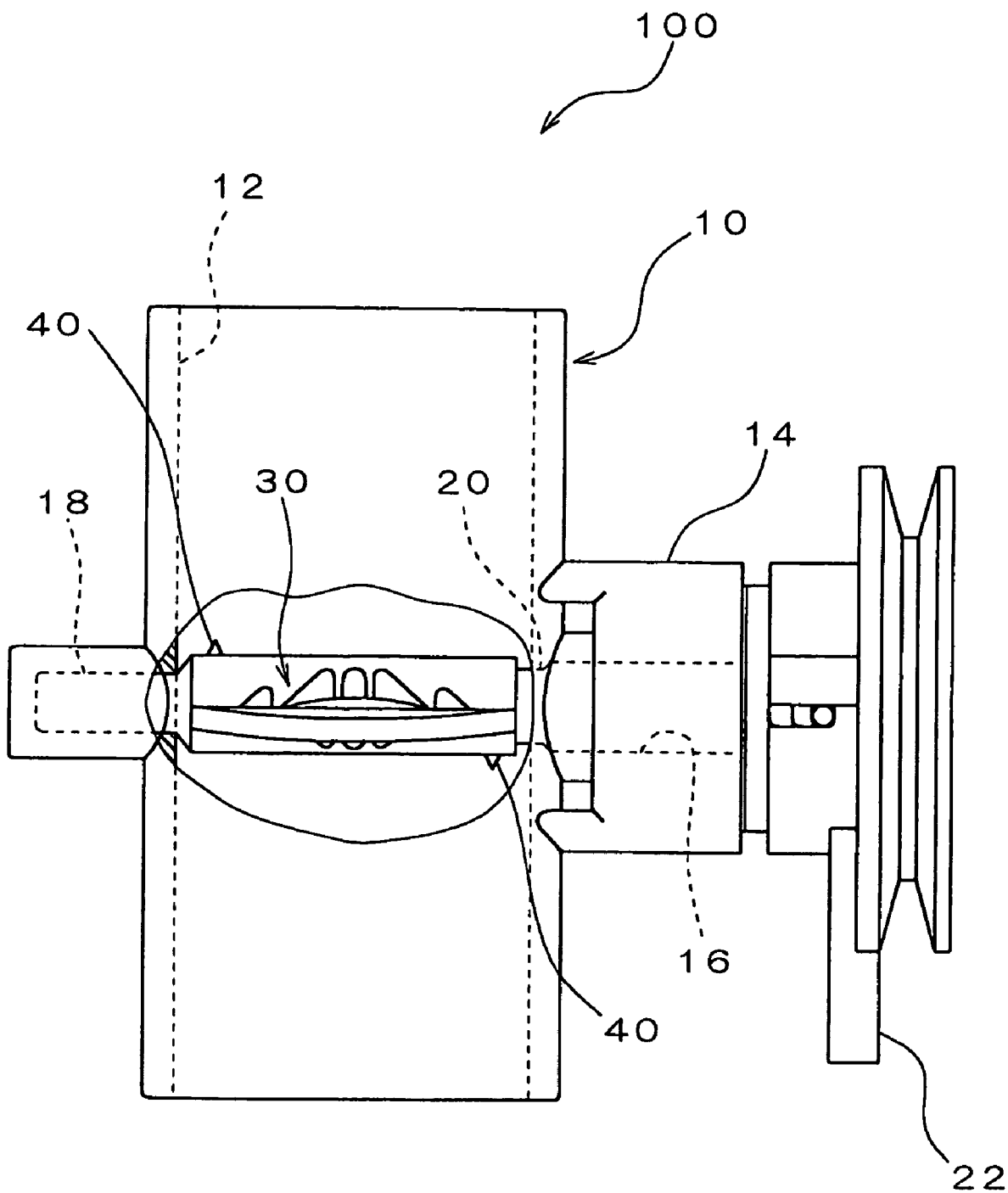
FIG. 1 is a front view of a throttle valve device according to an embodiment.
Figure 2:
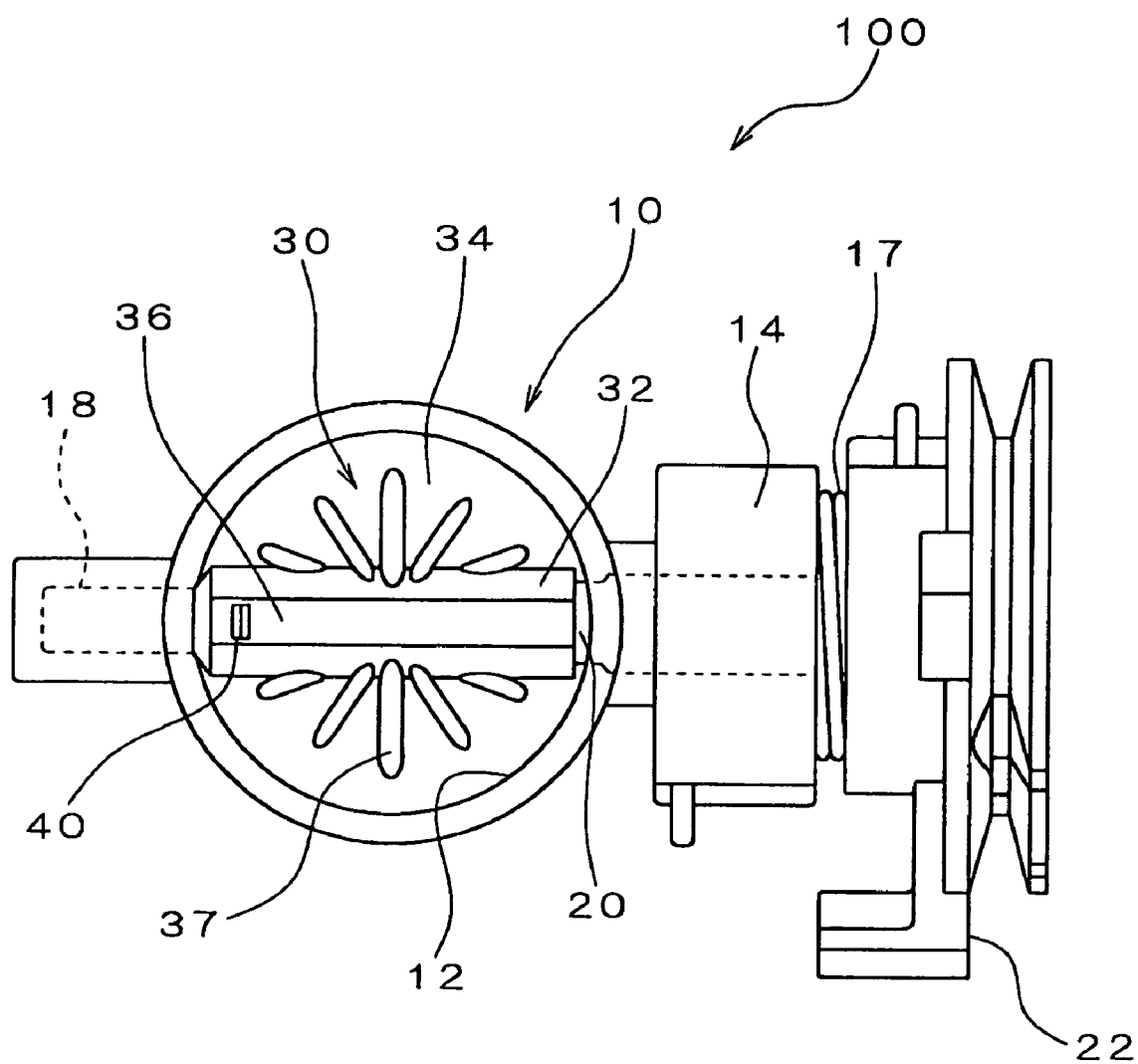
FIG. 2 is a plan view of the throttle valve device shown in FIG. 1.

FIG. 1 is a front view of a throttle valve device of an embodiment. FIG. 2 is a plan view of the throttle valve device shown in FIG. 1. As shown in FIGS. 1, 2, the throttle valve device 100 of the embodiment includes a throttle body 10, a throttle shaft 20, and a throttle valve 30.

The throttle body 10 forms an intake passage 12 that feeds an internal combustion engine (not shown) with fuel, being molded as a single-piece using resin material such as PBT (saturated polyester resin) and nylon. In a middle of the throttle body 10, a shaft insertion portion 14 is formed to outwardly protrude. Within the shaft insertion portion 14, a shaft aperture 16 is formed to be perpendicular to a central axis of the intake passage 12. Further, within the shaft insertion portion 14, a circular ring groove is formed. Within the circular ring groove, a coil spring 17 is contained to be locked in one end.

The throttle shaft 20 is formed as a single-piece so that a metal bar is inserted and its periphery is surrounded by synthetic resin such as PBT. In one end of the throttle shaft 20, an acceleration lever 22 is molded as a single-piece. The throttle shaft 20 is rotatably inserted within the shaft aperture 16 of the shaft insertion portion 14 formed in the shaft body 10. The acceleration lever 22 locks the other end of the coil spring 17 that is contained in the circular ring groove of the shaft insertion portion 14. Further, a tipping portion of the throttle shaft 20 is not covered, so that the tipping portion is rotatably inserted with metal being exposed within a bearing portion 18 of the throttle body 10.

Figure 3:
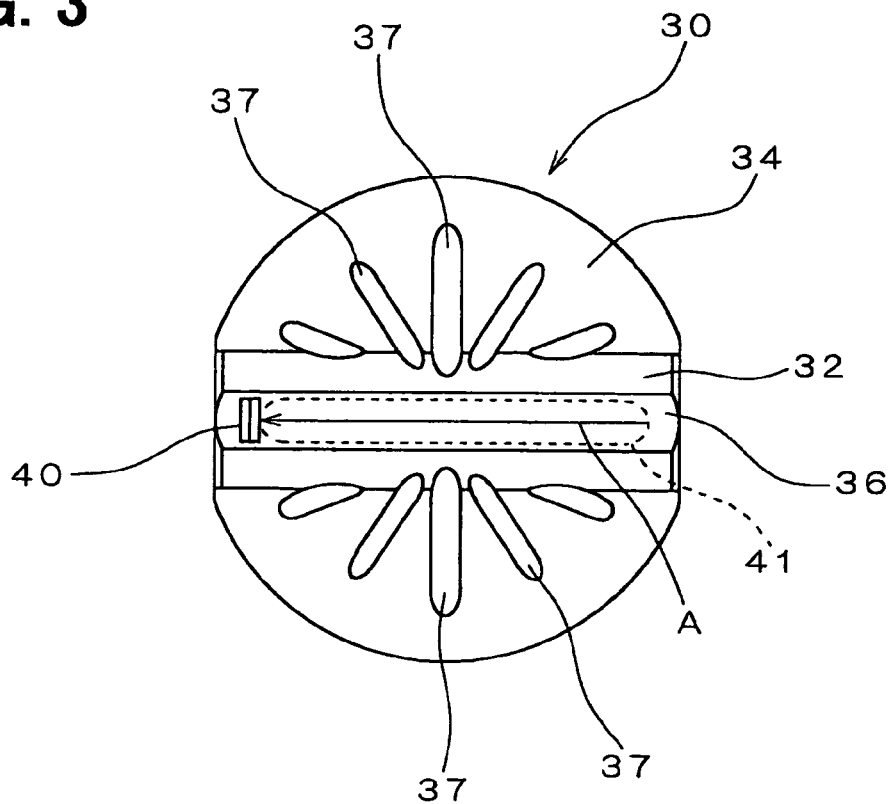
FIG. 3 is a plan view of a throttle valve.
Figure 4:
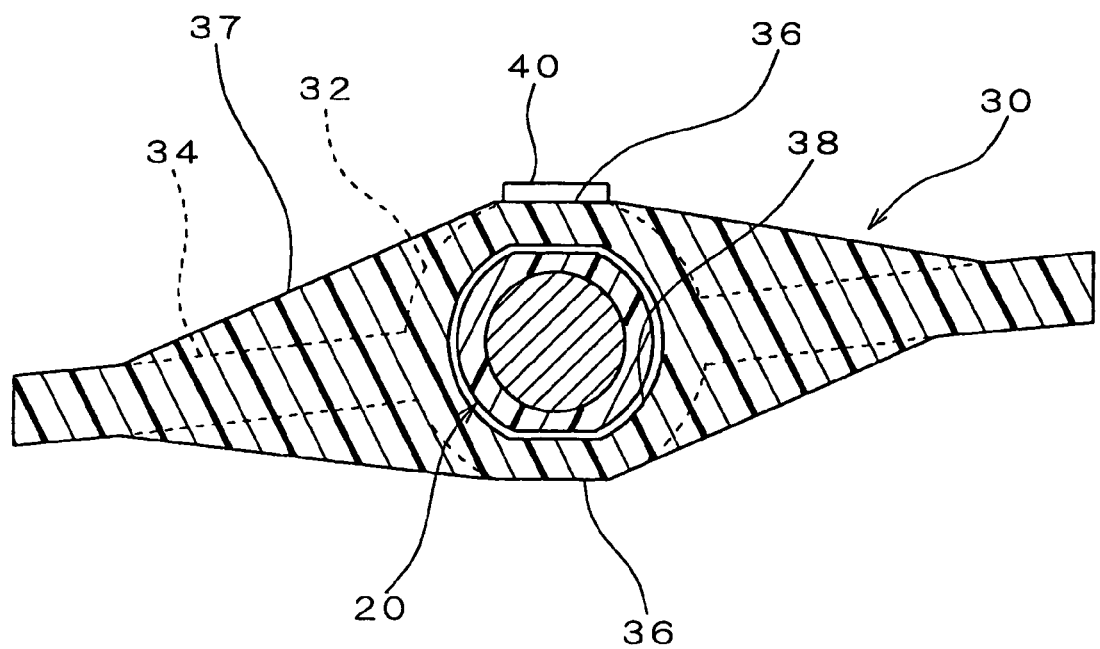
FIG. 4 is an enlarged sectional view of a throttle valve.

The throttle valve 30 is a butterfly valve and made of resin material such as PBT. FIG. 3 is a plan view of the throttle valve 30. FIG. 4 is an enlarged sectional view of the throttle valve 30, showing a sectional view of the throttle shaft 20 assembled with the throttle valve 30. As shown in FIG. 3, the throttle valve 30 includes a cylinder portion 32 and a valve element portion 34 that is outwardly integrated with the cylinder portion 32. The cylinder portion 32 has a flat portion 36 along a longitudinal direction on the outer surface. Further, in proximity of the connecting portion of the cylinder portion 32 and the valve element portion 34, multiple ribs 37 are formed for reinforcing the connecting portion.

Further, the flat portion 36 of the cylinder portion 32 is a portion through which a radiated laser beam is incident, being formed in a flat surface so that the laser beam properly enters an inside without being diffused. The thickness of the flat portion 36 is set to, e.g., 2 mm or less so that the incident laser beam from the surface uniformly reaches the surface of the throttle shaft 20. The cylinder portion 32 includes a shaft aperture 38 that is used for the throttle shaft 20 being inserted. The cylinder portion 32 has a sectional shape that prevents the throttle valve 30 from rotating without any restraint around the axial direction of the throttle shaft 20. For instance, the shaft aperture 38 includes a flat surface corresponding to the flat portion 36, and a cylindrical surface, while, likewise, the throttle shaft 20 inserted into the cylinder portion 32 also includes a flat surface corresponding to the flat portion 36, and a cylindrical surface corresponding to other portions.

Further, on the flat portion 36, a convex portion 40 is formed as a stepping portion to be perpendicular to a longitudinal direction of the cylinder portion 32. The convex portion 40 is formed close to the welding region 41.

The resin material used for forming the above-described throttle valve 30 (in particular, resin material of a portion corresponding to the flat portion 36) has a transmission property for a laser beam. By contrast, the resin material used for forming the throttle shaft 20 (in particular, resin material of a portion corresponding to the flat portion 36) has an absorption property for a laser beam. Consequently, the laser beam radiated from outside the throttle valve 30 transmits the flat portion 36 of the throttle valve 30 to reach the throttle shaft 20.

The throttle valve device 100 of the embodiment includes the above-described structure. Next, an assembling process will be explained where the throttle valve 30 and throttle shaft 20 of the throttle valve device 100 are assembled using a laser welding device.

Figure 5:
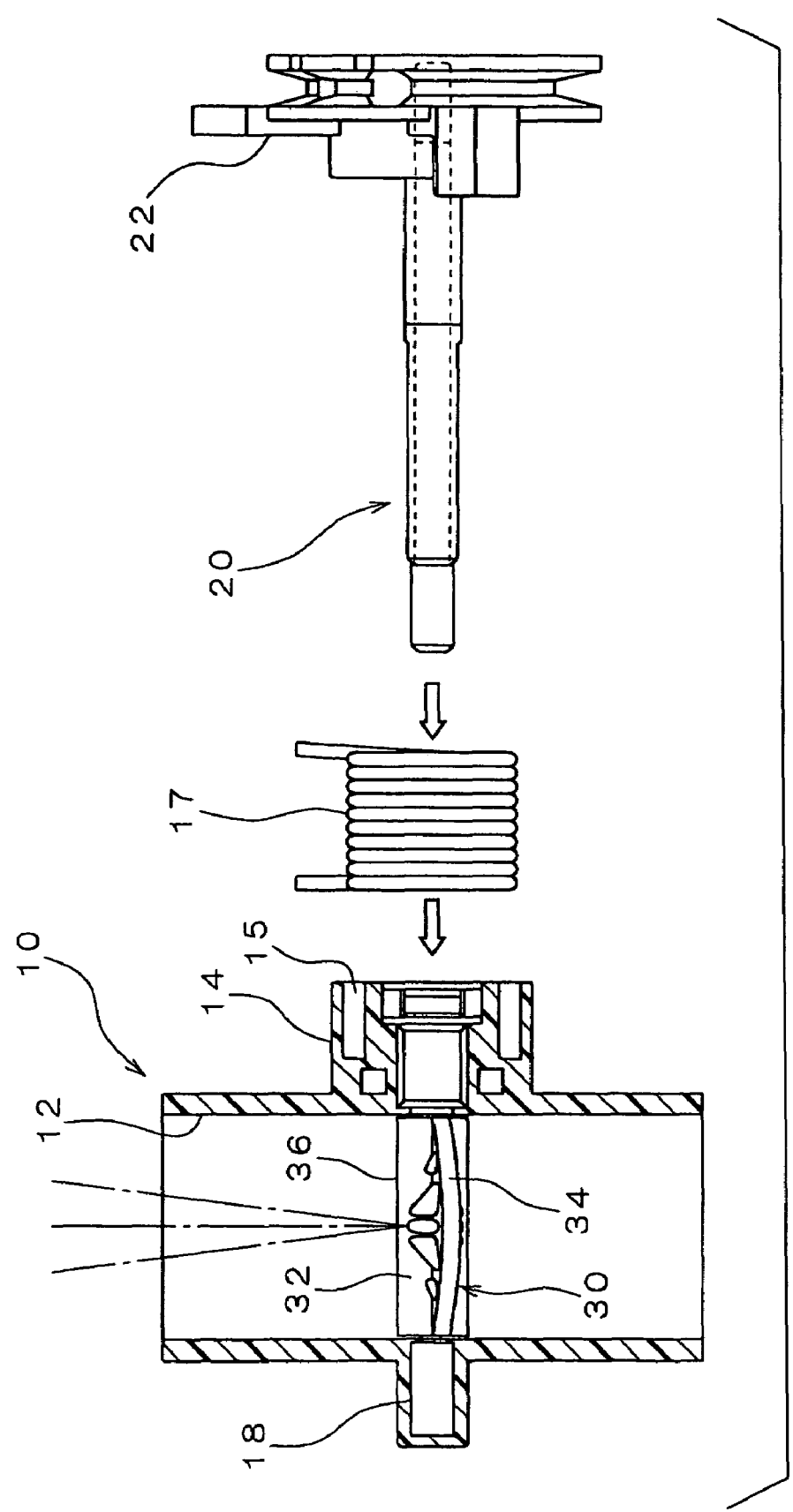
FIG. 5 is a view for explaining an assembling process of a throttle valve device.

FIG. 5 explains the assembling process of a throttle valve device. Further, FIG. 6 explains a laser welding process with respect to a throttle valve device.

As shown in FIG. 5, the coil spring 17 is inserted into the circular ring groove 15 of the shaft insertion portion 14 of the throttle body 10. The throttle shaft 20 is inserted into the shaft aperture 16 in the shaft insertion portion 14 of the throttle body 10 when the throttle valve 30 is disposed in a given position within the intake passage 12 of the throttle body 10. The tipping portion of the throttle shaft 20 is then inserted into the cylinder portion 32 of the throttle valve 30 so that the throttle shaft 20 and the throttle valve 30 are fittingly inserted within the bearing portion 18 while, of the throttle shaft 20 and the throttle valve 30, portions to be welded face each other. Thus, the cylinder portion 32 of the throttle valve 30 is fitted in a given position of the throttle shaft 20, within the throttle body 10.

Figure 6:
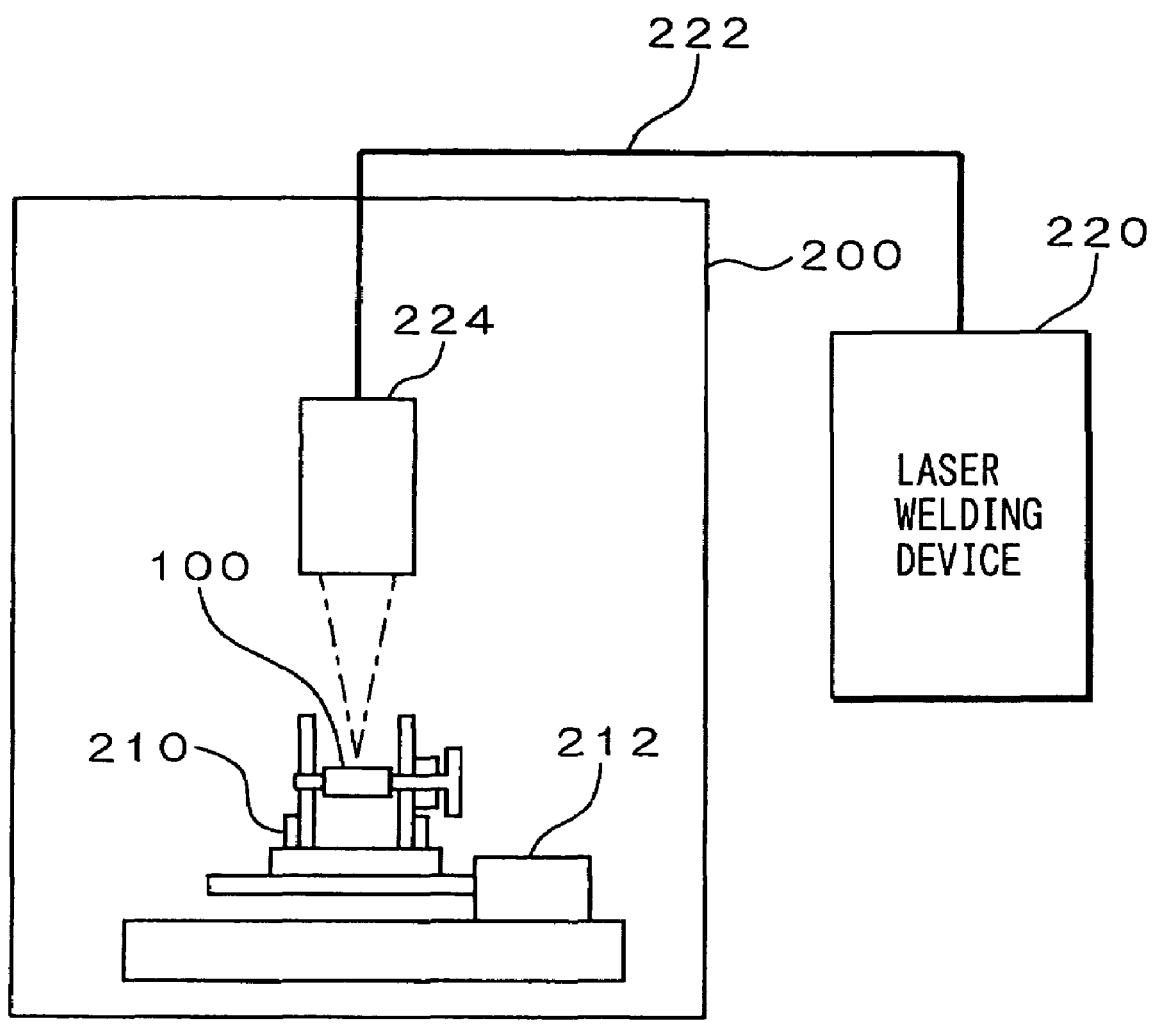
FIG. 6 is a view for explaining a laser welding process with respect to a throttle valve device.
Figure 7:
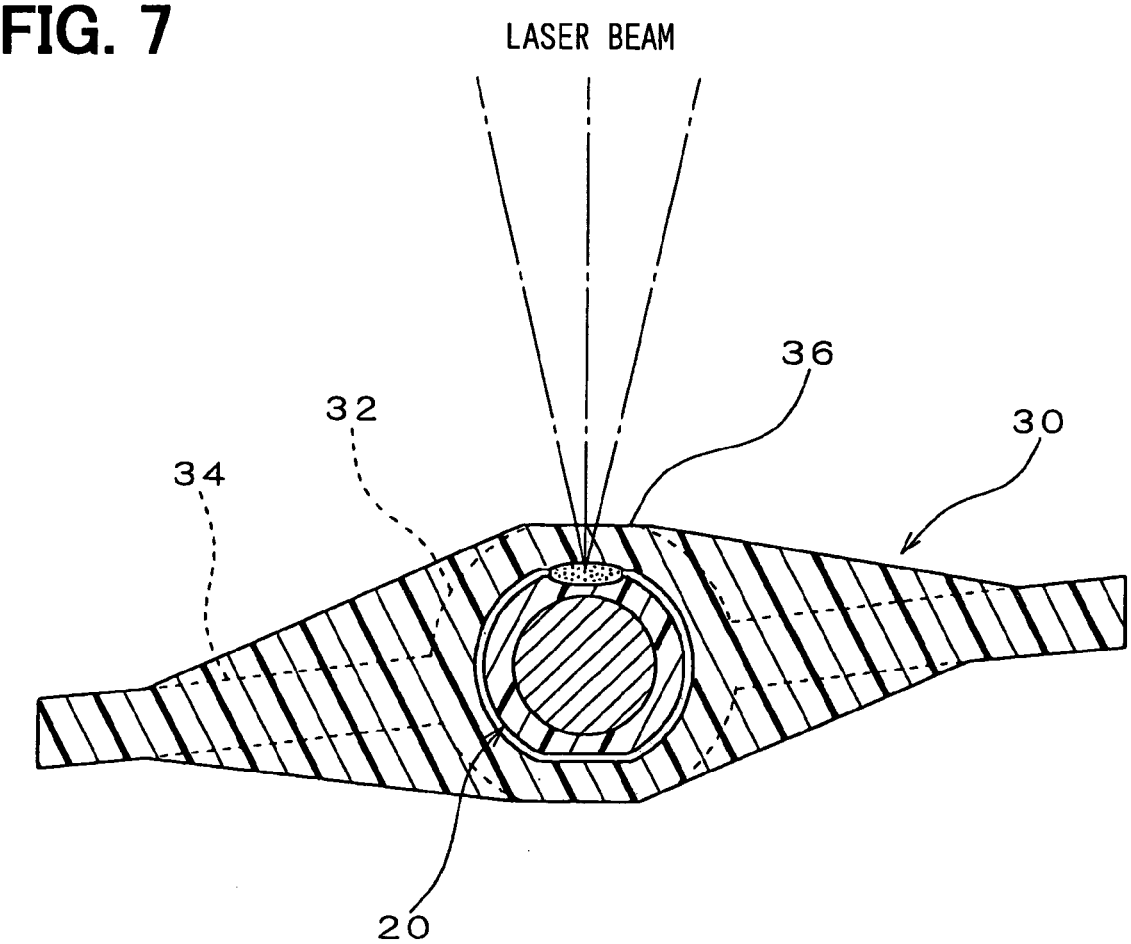
FIG. 7 is a sectional view of a throttle valve when a laser light is radiated.

Next, as shown in FIG. 6, an assembled throttle valve device 100 prior to welding is disposed in a welding fixture 210 within a process chamber 200. The welding fixture 210 is mounted on an XY table 212 to move the throttle valve device 100 within a given region. Above the welding fixture 210, the beam radiating device 224 is disposed that is connected with the laser welding device 220 outside the process chamber 200 via an optical fiber 222. The beam radiating device 224 includes multiple lenses to collect laser beams outputted from a laser oscillating unit within the laser welding device 220 and then radiate the collected beams upon the cylinder portion 32 of the throttle valve 30 of the throttle valve device 100 fixed to the welding fixture 210. The laser oscillating unit includes a semiconductor laser oscillating unit with 20 to 30 W outputs. A moving speed of the XY table 212 is set to approximately 10 mm/sec.

While the laser beams are radiated on the surface (flat portion 36) of the cylinder portion 32 of the throttle valve 30 from the beam radiating device 224, the welding fixture 210 is moved along the longitudinal direction of the flat portion 36. For instance, as shown in arrow A in FIG. 3, since the XY table 212 moves the welding fixture 210 to one direction, the irradiated position of the laser beams relatively moves from, of the flat portion 36, one end opposite to the convex portion 40 towards the convex portion 40 till exceeding the convex portion 40. Here, the laser beams radiated from the beam radiating device 224 to the respective portions to be welded of the throttle valve 30 and throttle shaft 20 enter and transmit the flat portion 36 of the cylinder portion 32 of the throttle shaft 20 to reach the surface of the internal throttle shaft 20 and be then absorbed. This laser irradiation welds the surface of the throttle shaft 20, so that the resultant heat melts an inside of the cylinder portion 32 of the throttle valve 30. The throttle shaft 20 and the throttle valve 30 are thereby welded with each other. Further, when the laser beams are radiated on the convex portion 40 formed on the flat portion 36, the temperature of the convex portion 40 increases to thereby melt or burn the convex portion 40.

After the laser welding to one flat portion 36 of the cylinder portion 32 of the throttle valve 30 is thus finished, the throttle valve device 100 is reversed up and down so that the laser welding is also applied to the other flat portion 36.

Figure 8:
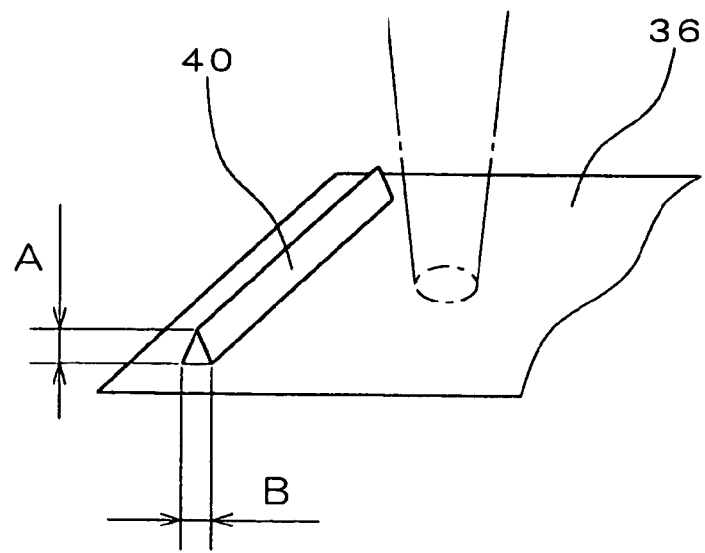
FIG. 8 is a perspective view showing a detailed shape of a convex portion.

Next, the detail of the convex portion 40 will be explained. FIG. 8 is a perspective view showing a detailed shape of the convex portion 40. As shown in FIG. 8, the convex portion 40 has a height A and a bottom width B, having a given length that is perpendicular to an irradiation direction (of an arrow A in FIG. 3). For instance, the height A and the width B are set to approximately 0.3 mm.

As explained above, the flat portion 36 disposed in the cylinder portion 32 of the throttle shaft 30 has a flat shape for properly inwardly accepting the laser beams, without the laser beams being diffused. By contrast, in a case where the convex portion 40 disposed close to the end of the flat portion 36 is irradiated, the laser beams are diffused to thereby increase the temperature of the convex portion 40. Further, the convex portion 40 has a thermal capacity lower than the surrounding flat portion 36, and furthermore, the resultant heat is not easily conducted to the surrounding flat portions 36. This rapidly increases the temperature of the convex portion 40, resulting in melting and further burning out due to the additional temperature increase.

Thus, in the throttle valve device 100 of the embodiment, the convex portion 40 is formed close to the end of the flat portion 36 of the cylinder portion 32 of the throttle valve 30. When the laser welding is performed by radiating laser beams in the flat portion 36, the convex portion 40 formed in a position close to the welding region is also irradiated. When the laser beams are radiated on the convex portion 40, the convex portion 40 is melted or burned, which leaves a trace of melting or burning in the convex portion 40. Visually observing the presence or absence of the trace thereby enables a determination whether or not the throttle valve device 100 is posterior to the laser welding.

Further, the laser irradiation is performed by a successive irradiation that is executed while the irradiated position is moved. The whole of the welded portions and the convex portion 40 are thereby irradiated with the laser beams by slightly broadening an irradiated region (laser beam irradiation region) to thereby include the convex portion 40. This eliminates necessity of changing the structure of the beam radiating device 224 or the like, so that the cost necessary for the laser welding can be prevented from increasing.

Further, forming the convex portion 40 on the surface of the flat portion 36 causes the diffusion of the laser beams in the convex portion 40 to thereby increase the temperature of the convex portion 40. Furthermore, since the convex portion 40 has a small heat capacity, the heat is not easily conducted from the convex portion 40 to the surrounding portions. This enables the secure generation of the melting or burning of the convex portion 40 by the laser irradiation.

Further, forming the convex portion 40 on the surface of the flat portion 36 enables increase of a rigidity of the flat portion 36.

Further, the present invention is not limited to the above embodiment, but it is possible to be variously modified within a region of the scope of the present invention. In the above-described embodiment, the convex portion 40 is formed close to the end of the flat portion 36 of the cylinder portion 32 of the throttle valve 30. However, the object of the convex portion 40 is to prevent the laser beam from properly entering without being diffused, so that another stepping portion other than the convex portion 40 can be substituted.

Figure 9:
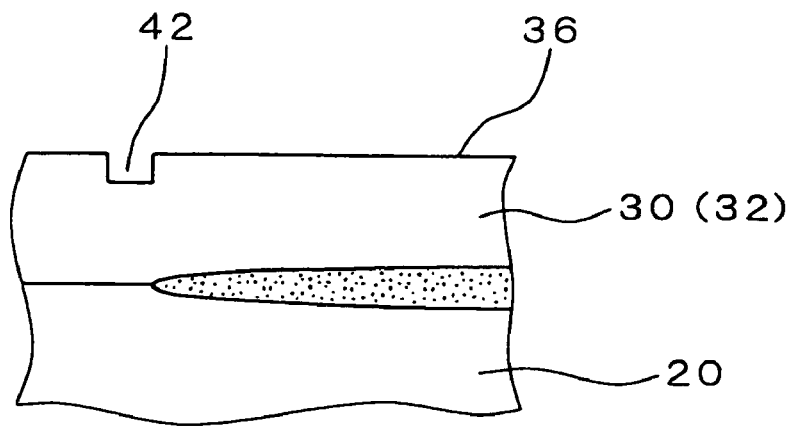
FIG. 9 is a view showing a modified example of a stepping portion.

FIG. 9 is a view showing a modified example of a stepping portion. In the modified example shown in FIG. 9, instead of the convex portion 40, a concave portion 42 is formed on the flat portion 36 of the cylinder portion 32. In this case, the irradiated position of the laser beams is relatively moved from the end of the flat portion 36 opposite to the concave portion 42, towards the concave portion 42 till reaching the concave portion 42. When the irradiated position of the laser beams reaches the proximity of the concave portion 42, the laser beams are diffused in the proximity of the end of the concave portion 42. This increases the temperature of the proximity of the end, so that the concave portion 42 is melted or burned similarly with the convex portion 40.

Figure 10:
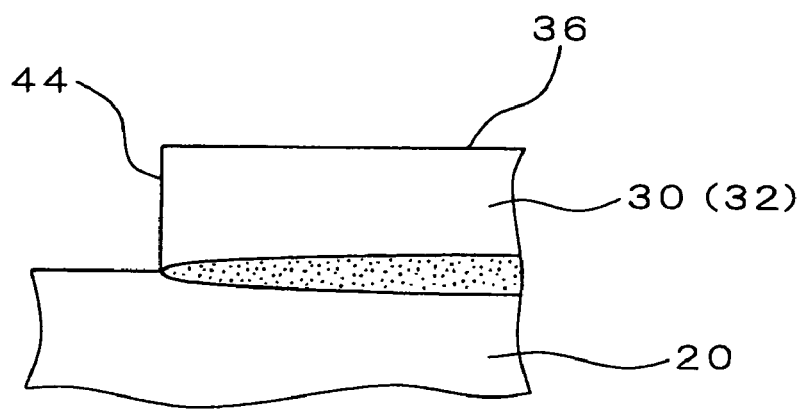
FIG. 10 is a view showing another modified example of a stepping portion.

FIG. 10 is a view showing another modified example of a stepping portion. In the modified example shown in FIG. 10, instead of the convex portion 40, a stepping portion 44 formed by a cross sectional surface of the flat portion 36 is on the surface end of the flat portion 36 of the cylinder portion 32. In this case, the irradiated position of the laser beams is relatively moved from the end of the flat portion 36 opposite to the stepping portion 44, towards the stepping portion 44 till reaching the stepping portion 44. When the irradiated position of the laser beams reaches the stepping portion 44, the laser beams are diffused in the proximity of the end of the stepping portion 44 (or in the proximity of the portion connected with the flat portion 36). This increases the temperature of the proximity of the end, so that the proximity of the stepping portion 44 is melted or burned similarly with the convex portion 40.

Figure 11:
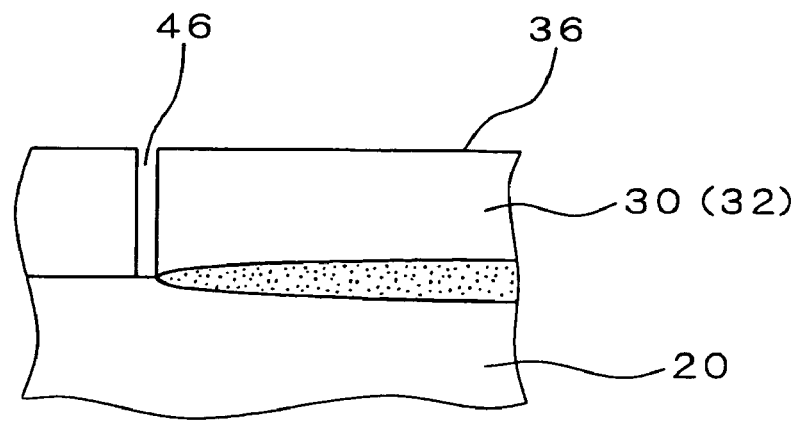
FIG. 11 is a view showing another modified example of a stepping portion.

FIG. 11 is a view showing another modified example of a stepping portion. In the modified example shown in FIG. 11, instead of the convex portion 40, a penetrating portion 46 is formed on the surface end of the flat portion 36 of the cylinder portion 32. In this case, the irradiated position of the laser beams is relatively moved from the end of the flat portion 36 opposite to the penetrating portion 46, towards the penetrating portion 46 till reaching the penetrating portion 46. When the irradiated position of the laser beams reaches the penetrating portion 46, the laser beams are diffused in the proximity of the end of the penetrating portion 46 (or in the proximity of the portion connected with the flat portion 36). This increases the temperature of the proximity of the end, so that the proximity of the penetrating portion 46 is melted or burned similarly with the convex portion 40.

Thus, even when various stepping portions other than the convex portion 40 are used, the radiated laser beams are diffused on the surface of the flat portion 36. By these stepping shapes, the proximity of the corresponding surface of the flat portion 36 is melted or burned. Therefore, visually observing the presence or absence of the traces enables confirmation of the presence or absence of the performance of the laser welding.

Further, in the above-described embodiment, the convex portion 40 is formed close to the end of the flat portion 36 of the cylinder portion 32. However, the convex portion 40 can be formed around the center of the flat portion 36. Further, the convex portion 40 can be simply conical shaped or cylindrical shaped. Further, multiple convex portions 40 can be disposed on the surface of the flat portion 36.

Figure 12:
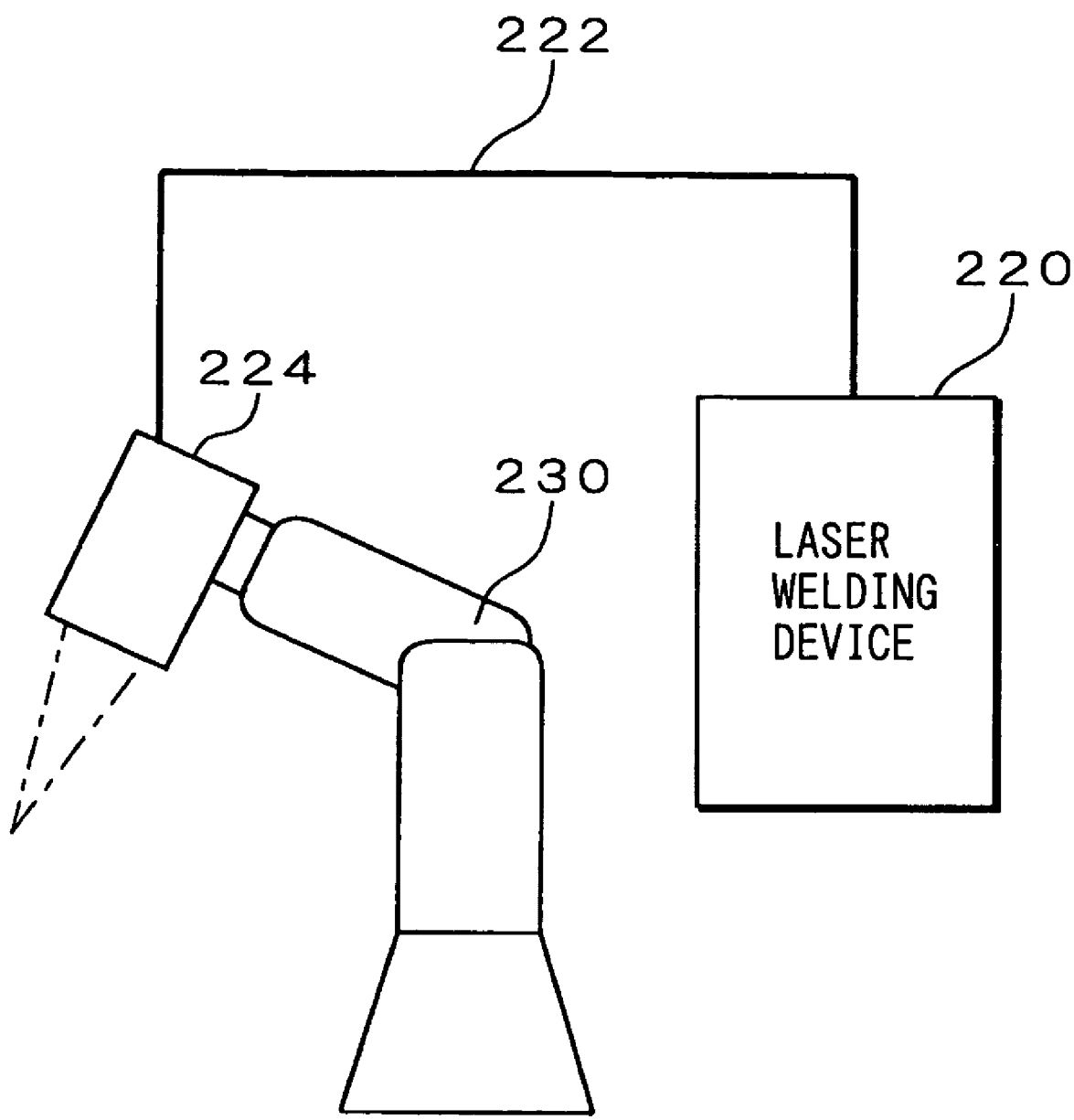
FIG. 12 is a view showing another irradiation method of abeam radiating device.

Further, in the above-described embodiment, the XY table 212 moves the throttle valve device 100. However, the object is to change the relative positions of the beam radiating device 224 and the throttle valve device 100, so that the beam radiating device 224 itself can be moved. For instance, as shown in FIG. 12, a robot 230 is provided with a beam radiating device 224 at the tipping of its arm, so that the robot 230 moves the arm towards a given direction to thereby move the beam radiating device 224.

In the above-described embodiment, the successive irradiation that relatively moves the beam radiating device 224 relative to the throttle valve device 100 is explained. However, a bulk irradiation can be used that radiates laser beams at once over the welding region and the convex portion 40.

In the above-described embodiment, the confirmation of the presence or absence of the laser welding is performed by observing the trace of melting or burning of the convex portion 40. Further, by previously checking a relationship between a degree of the melting or burning of the convex portion 40 and a laser output strength, the timing for exchange due to the operating life of the semiconductor laser oscillating unit can be determined each time the trace of melting or burning of the convex portion 40 is observed.

Further, in the above-described embodiment, an assembling of the throttle valve device 100 by the laser welding is explained. However, the present invention can be directed to a case where a first component and a second component as a target of the laser welding is another combination other than that of the throttle valve 30 and the throttle shaft 20.

It will be obvious to those skilled in the art that various changes may be made in the above-described embodiments of the present invention. However, the scope of the present invention should be determined by the following claims.

What is claimed is:

1. A laser welding method for welding with each other
    a first component that is made of resin material having a transmission property for a laser beam and includes a stepping portion on a surface thereof irradiated by the laser beam and
    a second component made of resin material having an absorption property for a laser beam,
    the laser welding method comprising steps of:
    disposing the first component and the second component so that a portion of the first component to be welded and a portion of the second component to be welded face each other; and
    radiating the laser beam from the surface of the first component to the portions to be welded so that the stepping portion is included in a part of an irradiated region.

2. The laser welding method of claim 1,
    wherein irradiation of the laser beam is performed by a successive irradiation that is successively executed while an irradiated position is moved.

3. The laser welding method of claim 1,
    wherein irradiation of the laser beam is performed by a bulk irradiation that is executed so that the portions to be welded and the stepping portion are at once irradiated using a light source that is aligned in a row.

4. The laser welding method of claim 1,
    wherein the stepping portion is a convex portion.

5. The laser welding method of claim 1,
    wherein the stepping portion is a concave portion.

6. A laser welding structure comprising:
a first component that is made of resin material having a transmission property for a laser beam and includes a stepping portion on a surface thereof irradiated by the laser beam;
a second component that is made of resin material having a absorption property for a laser beam and includes a second surface facing a first surface of the first component;
a welded portion where the first component and the second component are welded because of concurrently melting of at least a part of the first surface and at least a part of the second surface; and
a trace of one of melting and burning that is formed at the stepping portion.

7. The laser welding structure of claim 6,
wherein the stepping portion is a convex portion.

8. The laser welding structure of claim 6,
wherein the stepping portion is a concave portion.

9. The laser welding structure of claim 6,
wherein the stepping portion is a penetrating portion formed in a spacing from the surface irradiated by the laser beam to a surface where the welded portion is formed, and
wherein the trace is at least formed in proximity of the irradiated surface of the penetrating portion.

10. The laser welding structure of claim 6,
wherein the first component is formed by resin molding using a plurality of molding shapes, and
wherein the stepping portion is a convex portion formed at the resin molding in accordance with fitting surfaces of the plurality of molding shapes.

11. The laser welding structure of claim 6,
wherein the first component is formed by resin molding using a molding shape, and
wherein the stepping portion is a convex and concave portion formed in accordance with a pushing pin provided in the molding shape for extracting the first component from the molding shape at the resin molding.

12. A throttle valve device comprising:
a first component that is made of resin material having a transmission property for a laser beam and includes a stepping portion on a surface thereof irradiated by the laser beam;
a second component that is made of resin material having a absorption property for a laser beam and includes a second surface facing a first surface of the first component;
a welded portion where the first component and the second component are welded because of concurrently melting of at least a part of the first surface and at least a part of the second surface; and
a trace of one of melting and burning that is formed at the stepping portion,
wherein the first component is a throttle valve provided within a throttle body becoming a passage of a fuel for feeding an internal combustion engine, and
the second component is a throttle shaft supporting the throttle valve so that an inclination angle to the passage is able to be changed.

* * * * *